United States Patent [19]

Buktenica et al.

[11] Patent Number: 5,669,009
[45] Date of Patent: Sep. 16, 1997

[54] SIGNAL PROCESSING ARRAY

[75] Inventors: Jerald A. Buktenica, Northridge; Michael D. Yoo, West Hills, both of Calif.

[73] Assignee: Hughes Electronics, Los Angeles, Calif.

[21] Appl. No.: 606,511

[22] Filed: Feb. 23, 1996

Related U.S. Application Data

[63] Continuation of Ser. No. 269,426, Jun. 30, 1994, abandoned.
[51] Int. Cl.$^6$ ............................. G06F 13/00; G06F 15/00
[52] U.S. Cl. ................ 395/800.35; 364/229; 364/230; 364/232.93; 364/931; 364/931.01; 364/931.4
[58] Field of Search ........................ 395/800; 364/229, 364/230, 232.93, 931, 931.01, 931.4

[56] References Cited

U.S. PATENT DOCUMENTS

| | | | |
|---|---|---|---|
| 4,772,956 | 9/1988 | Roche et al. | 358/260 |
| 4,796,232 | 1/1989 | House | 365/185 |
| 4,878,002 | 10/1989 | Heatzig et al. | 318/568.2 |
| 4,999,715 | 3/1991 | Porcellio et al. | 358/433 |
| 5,212,742 | 5/1993 | Normile et al. | 382/56 |
| 5,293,586 | 3/1994 | Yamazaki et al. | 395/164 |
| 5,361,385 | 11/1994 | Bakalash | 395/124 |
| 5,432,911 | 7/1995 | Mura et al. | 395/275 |

*Primary Examiner*—Jack B. Harvey
*Assistant Examiner*—Valerie Darbe
*Attorney, Agent, or Firm*—Leonard A. Alkov; Wanda K. Denson-Low

[57] ABSTRACT

A signal processing array architecture using a common multiport global memory to interface to a plurality of digital signal processors. The present architecture permits mixing of various types of digital signal processors, commercially available computers, and logic devices. The present signal processing architecture is comprised of a plurality of processing nodes (20) that each comprise a dual processor that is coupled to a local memory by way of a RAM loader bus. An emulated multiport memory is coupled to the dual processor by way of a local bus. A sensor bus is provided for transferring sensor signals from an external sensor to the emulated multiport memory. A global bus is provided that permits communication between each processing node. A bus controller is coupled between the emulated dual port memory and the sensor and global busses for controlling movement of signals to and from the emulated dual port memory. The present signal processing architecture provides a modular, programmable array of digital signal processors that has the flexibility to be used for different applications, thus reducing costs associated with any one application. Costs are also reduced by using commercially available processors. Modularity and programmability allow initial system development to proceed rapidly prior to the completion of processing algorithms and system specifications.

3 Claims, 3 Drawing Sheets

SIGNAL PROCESSING ARRAY

This is a continuation application Ser. No. 08/269,426, filed Jun. 30, 1994, now abandoned.

BACKGROUND

The present invention relates generally to signal processors, and more particularly to a signal processing array architecture that permits integration of multiple types of signal processors into a single processor.

Heretofore, implementation of custom processor arrays by the assignee of the present invention, has typically required an in-house developed processor. Typically, the processor and the array architecture are developed to effectively execute algorithms that are adapted for a specific signal processing application, such as for radar, infrared imaging, or sonar, for example. The cost to develop a processing array of this type is extremely high, and its adaptability to different applications has proven to be relatively low.

Thus, it is an objective of the present invention to provide a signal processing architecture that permits the efficient use of existing commercially developed processors, to provide for low cost signal processor development.

SUMMARY OF THE INVENTION

In order to meet the above and other objectives, the present invention is a signal processing array that employs a novel communications architecture using a common multiport global memory to interface to a plurality of digital signal processors. The present architecture takes advantage of the advances in semiconductor technology by allowing a mixing of various types of digital signal processors and other commercially available computers in a single reconfigurable array.

More particularly, the present signal processing architecture is comprised of a plurality of processing nodes that each comprise a dual processor that is coupled to a local memory by way of a RAM loader bus. An emulated multiport memory is provided that is derived from a single port memory and is coupled to the dual processor by way of a local bus. A sensor bus is provided that is adapted to transfer sensor signals from an external sensor to the emulated multiport memory. A global bus is provided that permits communication between processing nodes. A bus controller is coupled between the emulated dual port memory and the sensor and global busses that is adapted to control movement of signals to and from the emulated dual port memory.

The present signal processing array architecture provides for a modular, programmable array of digital signal processors that has the flexibility to be used for different applications, thus reducing costs associated with any one application. This is due to economics of scale and a reduction in the training costs for programmers and maintenance personnel. Costs are greatly reduced by using commercially available processors. Modularity and programmability allow system development to proceed rapidly prior to the completion of algorithms and system specifications. The signal processing array of the present invention thus provides a low cost array architecture that permits the use of existing commercially developed components, including digital signal processors, customized arithmetic units, and RISC computers, for example.

The present invention was initially developed for use in a millimeter wave radar imaging system adapted for commercial aircraft. It may also be used in any radar or infrared imaging system, for example, requiring extremely high digital signal processing throughput. The use of the present signal processing array architecture allows algorithm development to rapidly proceed without committing to an expensive dedicated hardware design. Additionally, the present invention has proven to be extremely adaptable, allowing algorithm changes during all phases of development.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
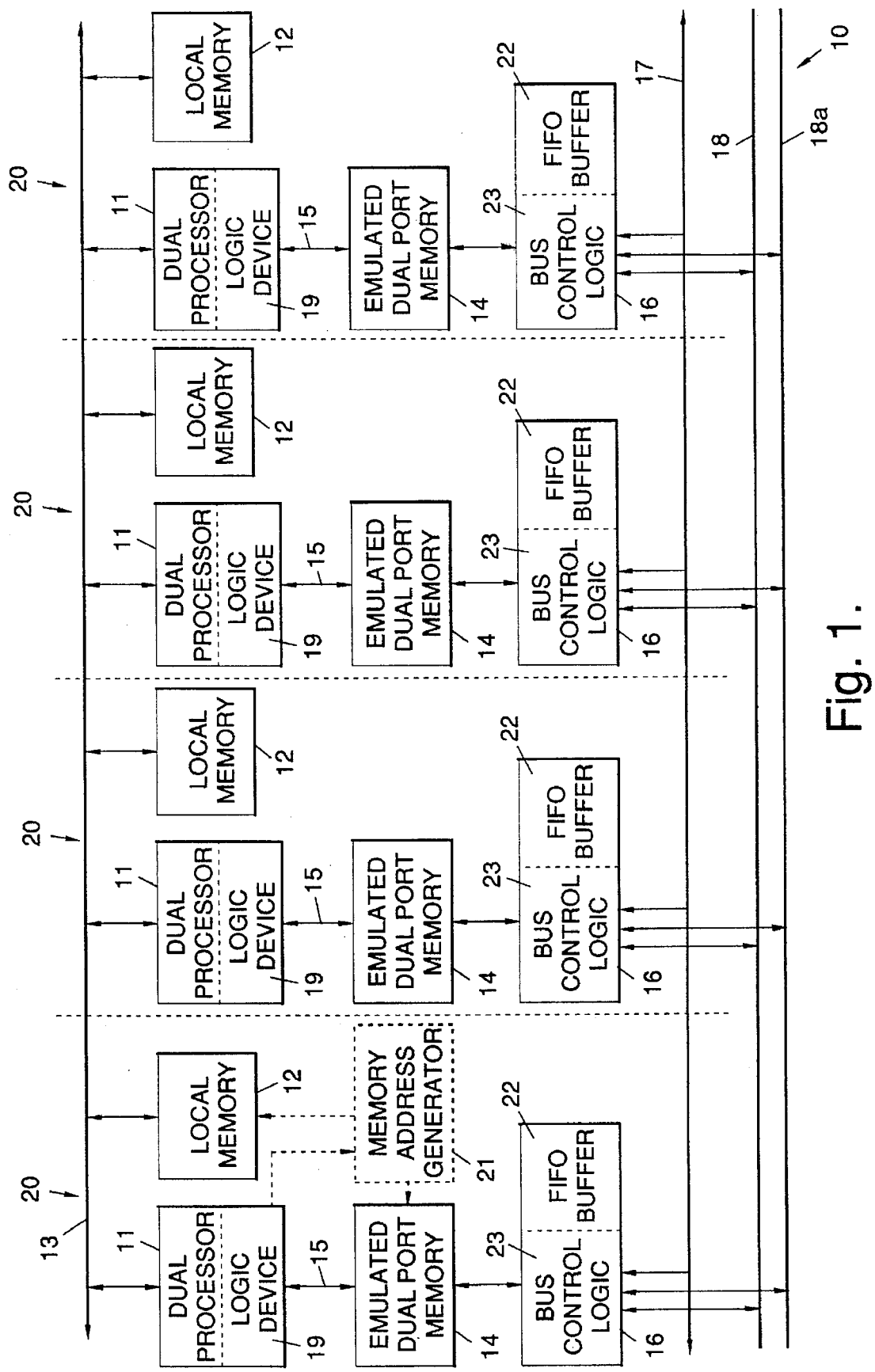
FIG. 1 shows an embodiment of a signal processing array architecture in accordance with the principles of the present invention.

Referring to the drawing figures, FIG. 1 shows an embodiment of a signal processing array architecture 10 in accordance with the principles of the present invention. The exemplary signal processing array architecture 10 shown in FIG. 1 is a parallel processor architecture 10 that is comprised of four processing nodes 20 (separated by dashed lines). However, it is to be understood that fewer or additional processing nodes 20 may be employed, and that the present invention is not limited to four nodes 20.

Each processing node 20 is comprised of a dual processor 11 and a local memory 12 that are coupled together by way of a RAM loader bus 13, an emulated dual port memory 14, and a bus controller 16 that includes a first-in, first-out (FIFO) buffer 22 and bus control logic 23. The dual processor 11 may be comprised of data and signal processors, such as are provided by an Intel model i960® processor, or an Analog Devices model ADSP21020 processor, or other commercial or VHSIC processing element, for example.

The dual processor 11 is coupled to the emulated dual port memory 14, or common multiport memory 14, by way of a local bus 15. The emulated dual port memory 14 may be implemented using a 128 K by 8 single port memory, for example. The emulated dual port memory 14 is coupled to the bus controller 16. The bus controller 16 is coupled to a sensor bus 17, a global bus 18, and to a control bus 18a, and is adapted to control movement of signals to and from the emulated dual port memory 14. The sensor bus 17 is adapted to communicate sensor signals, such as radar signals, or video signals derived from a radar system or infrared imager, respectively, for example. The global bus 18 is a conventional time delay multiplexed bus that is implemented in a manner well known to those skilled in the art.

The advantage of the present signal processing array architecture 10 is that it is completely modular. New processors 11 may be added to the architecture 10 with a minimum amount of hardware or software changes. VHSIC program participants and commercial semiconductor vendors have developed, and are currently developing, extremely sophisticated VLSI off-the-shelf high performance components. The signal processing array architecture 10 is designed to make the best use of these sophisticated digital signal processing components by making it possible to mix a variety of different commercial and VHSIC processors 11. Newer VLSI devices may be incorporated with, at most, a single new printed circuit board design with no major architectural, communication, or software changes. This modular implementation eliminates the need for specialized custom LSI components that are costly to produce and force a commitment to architectures that quickly become obsolete.

Communication between the parallel processors 11 is a critical area due to the wide variety of individual processor types that may be used in the architecture 10. This is a somewhat difficult problem, but there is a common denominator for substantially all existing and proposed programmable or nonprogramable digital processing devices: they all interface with a memory. Consequently, a functional interface comprising the common or emulated multiport memory 14 is used in the signal processing array architecture 10. In addition, a dedicated logic device 19 may be interfaced to the architecture 10, by simply adding an optional memory address generator 21 (shown in only one processing node 20) to the architecture 10. In this case, the memory address generator 21 is coupled to the logic device 19 (which replaces the dual processor 11) and is adapted to read and write data from and to the local memory 12 and common multiport memory 14 as is shown in FIG. 1.

Figure 2:
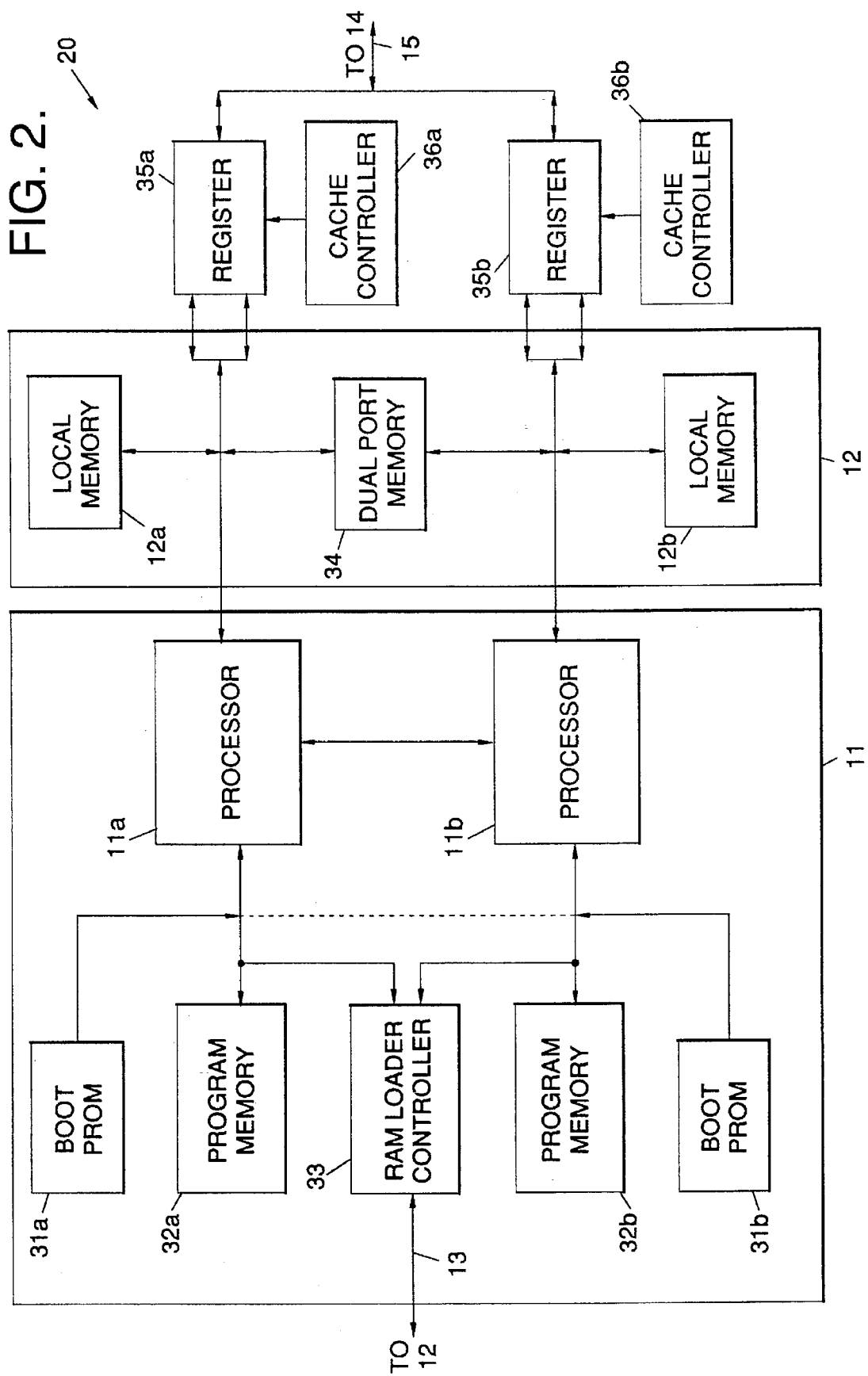
FIG. 2 shows a detailed block diagram of a first portion of a processing node of the signal processing array architecture of FIG. 1.

FIG. 2 shows a detailed block diagram of a portion of a processing node 20 of the signal processing array architecture 10 of FIG. 1, and in particular the dual processor 11 and the local memory 12. The processor 11 of the processing node 20 contains two processors 11a, 11b that are coupled to first and second boot programmable read-only-memories (PROM) 31a, 31b and to first and second program memories 32a, 32b that store startup routines and processing algorithms, respectively. The processors 11a, 11b are also coupled to a RAM loader controller 33 which couples the respective processors 11a, 11b to the RAM loader bus 13. The local memory 12 is comprised of separate local memories 12a, 12b that are coupled to the respective processors 11a, 11b, and to each other by way of a dual port memory 34. The respective processors 11a, 11b are also coupled to cache registers 35a, 35b that are respectively controlled by two cache controllers 36a, 36b in a conventional manner. The cache registers 35a, 35b are coupled to the local bus 15 which is coupled to the emulated dual port memory 14.

Figure 3:
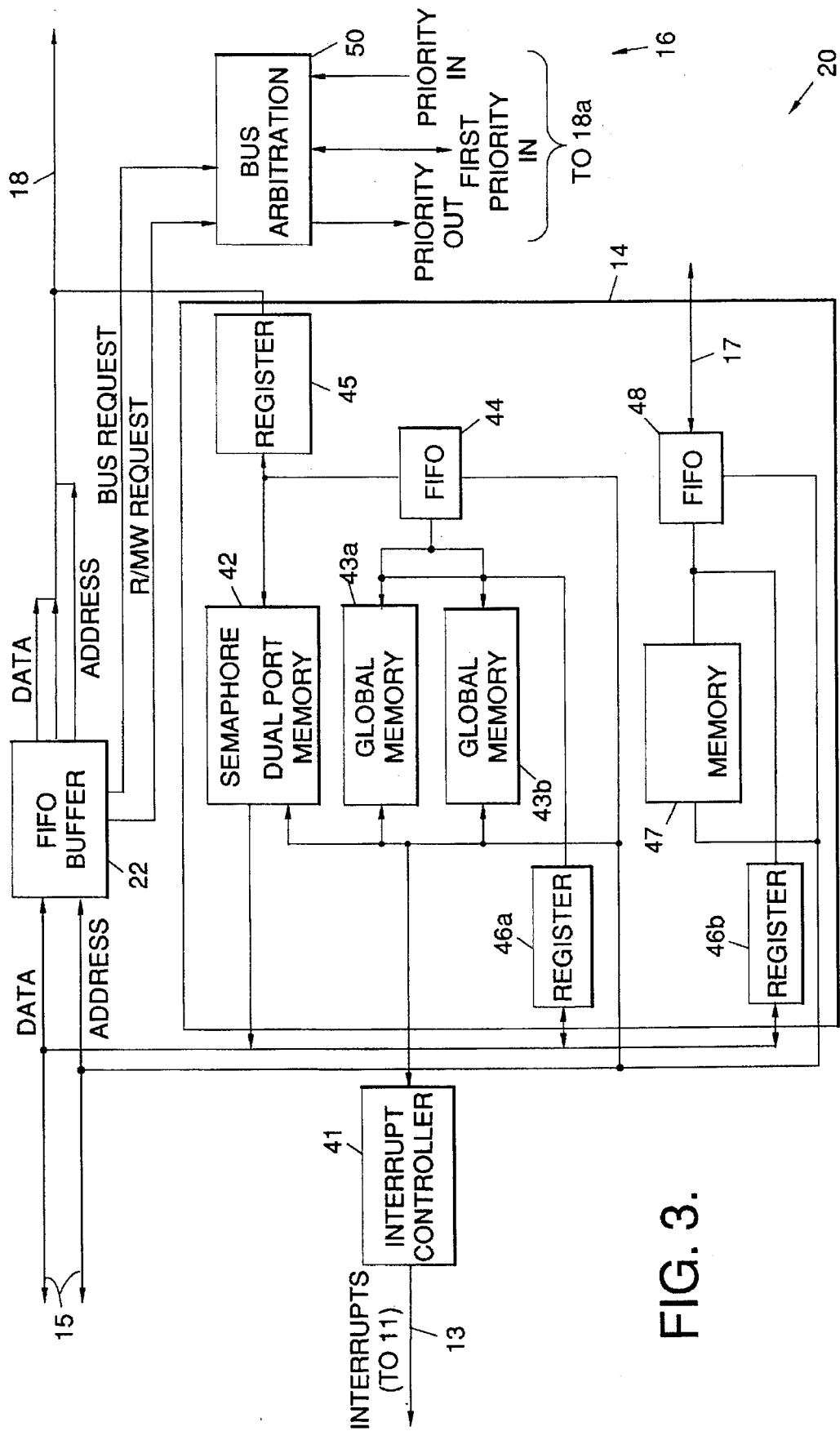
FIG. 3 shows details of a second portion of the processing node of FIG. 1.

FIG. 3 shows details of a second portion of the processing node 20 of FIG. 1, and particularly the emulated dual port memory 14 and bus controller 16. The emulated dual port memory 14 is comprised of an interrupt controller 41 that is coupled to the RAM loader bus 13. The interrupt controller 41 is connected to a semaphore structure that forms part of a dual port memory 42, and to two global memories 43a, 43b. The interrupt controller 41 is connected to address lines of the local bus 15 and to a second FIFO buffer 44. The two global memories 43a, 43b are coupled by way of the second FIFO buffer 44 to a register 45. The register is also coupled to the dual port memory 42. The data lines of the local bus 15 are coupled to the dual port memory 42, and to two registers 46a, 46b.

The address lines of the local bus 15 are connected by way of an input sensor memory (ISM) 47 to a third FIFO buffer 48. The two registers 46a, 46b are coupled between the address lines of the local bus 15 and the second and third FIFO buffers 44, 48. The data and address lines of the local bus 15 are coupled by way of the the FIFO buffer 22 to the global bus 18. The register 45 is also coupled to the global bus 18. Bus arbitration logic 50, that comprises the bus control logic 23, is coupled to the FIFO buffer 22 and to the processors 11 by way of the control bus 18a, and processes bus request signals, read-modify-write (R/MW) request signals, first priority in signals and priority in signals and generates priority out signals that grant access to the global bus 18 by a particular processor 11. Bus arbitration is accomplished in a conventional manner well-known to those skilled in the art.

The FIFO buffer 22 isolates the processor 11 from bus activity and allows the global memory 43a, 43b to communicate with processors 20 of varying speeds. The processor 11 writes to the global bus 18 via the FIFO buffer 22 which generates a bus request to the bus arbitration logic 50. If there is any valid data to be transferred from the FIFO buffer 22, a wire-ORed first priority in signal goes low. The first priority in signal initiates a polling sequence by activating the priority in signal beginning with the first processing node 20. When the priority in signal goes low, a bus request signal is recognized and data is transferred to the global bus 18. If the processing node 20 has a recognized bus request pending, the polling sequence stops for one bus period, and allows the data to be transmitted. If there is no pending "bus request", the priority in signal instantly causes the priority out signal to go high, which provides the priority in signal for the next processing node 20. In this way, sixteen nodes may be interrogated within one global bus clock period.

All processors 11 in the architecture 10 share a segment of memory address space in the emulated or common multiport memory 14 in which they are able to read and write. Functionally, if a processor 11 writes into a memory location in the common multiport memory 14, the value written thereto immediately occurs in the same memory location of the remaining common multiport memories 14 of the other processing nodes 20. Therefore, functionally, all processors 11 are able to read and write to and from the common multiport memory 14 regardless of the tasks the other processors 11 are required to perform.

The common multiport memories 14 are implemented with separate address and data structures for each port. This implementation cannot be modular since it involves an internal physical part of the semiconductor integrated circuit that forms each common multiport memory 14. Furthermore, the common multiport memories 14 decrease in density as the amount of silicon area required to support the ports increases. Consequently, the signal processing array architectural 10 provides for emulated dual port memories 14 that are functionally equivalent to physical multiport memories.

To achieve this, the memory 14 is accessed by way of a "cycle stealing" technique that is well known in the signal processing art, wherein both read and write operations are arbitrated and processed during a single processor cycle. When a processor 11 reads from the global memory 43a, 43b, it reads from a memory port connected to the local bus 15. No time penalty is incurred due to bus contention. When a processor 11 writes to the global memory 43a, 43b, it does so through a memory port connected to the time delay multiplexed global bus 18. All processors 11 are written to simultaneously using the global bus controller 16. There is a lime delay in placing the data on the global bus 18, but it does not slow down a transmitting processor 11 because this processor 11 writes into the FIFO buffer 22 in the global bus controller 16 and then returns to the operation it was performing. Bus transactions take place autonomously. Since the processing nodes 20 operate asynchronously, it is not possible to predict the exact actual lime at which new data is delivered by a particular processor 11 in the architecture 10. Consequently, a slight write transport lag may occur, but does not affect the overall throughput of the architecture 10.

A hardware implemented semaphore and interrupt structure implemented in the dual port memory 42 (FIG. 3) is provided to allow inter-program communications between the processing nodes 20. Bus arbitration for the semaphore and interrupt structure is modular, and does not decrease the bandwidth of the global bus 18. A simple polling technique is used with arbitration control distributed to each processing node 20. Each processing node 20 has an equal priority, and multiple requests are recognized on the basis of position on the global bus 18.

In the polling technique, the read-modify-write (R/MW) signal enables a memory location to be tested and modified in one indivisible cycle. This is an essential function of a multiprocessor system that performs task synchronization, event signaling and message passing. When the processor 11 needs to modify a semaphore control word, it issues a read-modify-write request to the bus arbitration logic 50 and enters a wait state. This request is processed in the same way as requests issued from the FIFO buffer 22, except that once the control of the global bus 18 is attained, it is held during the entire sequence required to read and if necessary, modify the semaphore control word.

Although this communication structure approximates a true global memory and is highly modular, there is a difficulty in that global memory 43a, 43b must be replicated at each processing node 20. To maximize the efficiency of the multiport memories 14, an address decoding scheme that may be implemented in a conventional manner by those skilled in the art is provided to allow the global memory 43a, 43b to be divided into sections that may be configured as part of the global memory address space duplicated at each processing node 20, or as a unique slice of address space assigned exclusively to a particular node 20. To further maximize the efficiency of the global memories 43a, 43b, byte addressing is supported by way of the local bus 15, such that, whenever the processor 11 accesses the local memory 12, it accesses (fetches) even and odd words at the same time and stores the two words in one of the cache registers 35a, 35b.

The signal processing architecture 10 has been reduced to practice and this implementation is comprised of four processing nodes 20, fabricated on eight multilayer printed circuit boards. The processor 11 used in this working embodiment is an Analog Devices ADSP21020 digital signal processor, which is a 32-BIT floating point digital signal processor. Each processing node 20 contains two ADSP21020 processors 11 for increased throughput as is shown in FIG. 2.

Thus there has been described a new and improved signal processing architecture that permits integration of multiple types of signal processors into a single processor. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A modular signal processing array architecture comprising:

a plurality of processing nodes wherein each node comprises:

(a) a local memory comprising:
  (i) first memory,
  (ii) second memory, and
  (ii) a dual port memory coupled between the first and second memories;

(b) a RAM loader bus coupled to the local memory;

(c) an emulated multiport memory comprising:
  (i) a dual port memory coupled to data lines of the local bus, wherein semaphore and interrupt structure with modular bus arbitration is implemented in said dual port memory to permit inter-program communication between said processing nodes,
  (ii) first global memory coupled to address lines of the local bus,
  (iii) second global memory coupled to address lines of the local bus,
  (iv) an input sensor memory coupled to the address lines of the local bus,
  (v) a first FIFO buffer coupled to the first and second global memories and to the address lines of the local bus,
  (vi) a register coupled between the first FIFO buffer and dual port memory and the global bus,
  (vii) a second FIFO buffer coupled to the input sensor memory, to the address lines of the local bus, and to the local bus,
  (viii) a second register coupled between the data lines of the local bus and the global memories, and
  (ix) a third register coupled between the data lines of the local bus and the input sensor memory;

(d) a processor coupled to said RAM loader bus, comprising:
  (i) first boot programmable read only memories for storing startup routines,
  (ii) second boot programmable read only memory for storing startup routines,
  (iii) first program memory for storing processing algorithms,
  (iv) second program memory for strong processing algorithms,
  (v) a memory loader controller coupled to the RAM loader bus and the first and second program memories for controlling the flow of data to and from the local memory,
  (vi) first and second cache registers coupled to the local memory, and
  (vii) first and second cache controllers coupled to the cache registers for controlling the flow of data to and from the local memory;

(e) a local bus coupled between the processor and the emulated multiport memory;

(f) a sensor bus for transferring sensor signals derived from an external sensor to the plurality of processing nodes;

(g) a global bus for coupling signals between the plurality of processing nodes, said global bus comprised of a time delay multiplexed bus; and (h) a bus controller coupled between the emulated multiport memory and the sensor and global busses for controlling movement of signals to and from the emulated multiport memory carried by the sensor and global busses.

2. A modular signal processing array architecture comprising:

a plurality of processing nodes wherein each node comprises:

(a) a local memory comprising:
   (i) first memory,
   (ii) second memory, and
   (iii) a dual port memory coupled between the first and second memories;

(b) a RAM loader bus coupled to the local memory;

(c) an emulated multiport memory comprising:
   (i) a dual port memory coupled to data lines of the local bus wherein semaphore and interrupt structure with modular bus arbitration is implemented in said dual port memory to permit inter-program communication between said processing nodes,
   (ii) first global memory coupled to address lines of the local bus,
   (iii) second global memory coupled to address lines of the local bus,
   (iv) an input sensor memory coupled to the address line of the local bus,
   (v) a first FIFO buffer coupled to the first and second global memories and to the address lines of the local bus,
   (vi) a register coupled between the first FIFO buffer and dual port memory and the global bus,
   (vii) a second FIFO buffer coupled to the input sensor memory, to the address lines of the local bus, and to the local bus,
   (viii) a second register coupled between the data lines of the local bus and the global memories, and
   (ix) a third register coupled between the data lines of the local bus and the input sensor memory;

(d) a dual processor comprising:
   (i) data processors, and
   (ii) signal processors;

(e) a local bus coupled between the dual processor and the emulated multiport memory;

(f) a sensor bus for transferring sensor signals derived from an external sensor to the plurality of processing nodes;

(g) a global bus for coupling signs between the plurality of processing nodes, said global bus comprised of a time delay multiplexed bus; and (g) a bus controller coupled between the emulated multiport memory and the sensor and global busses for controlling movement of signals to and from the emulated multiport memory carried by the sensor and global busses.

3. A modular signal processing array architecture comprising:

a plurality of processing nodes wherein each node comprises:

(a) a local memory comprising:
   (i) first memory,
   (ii) second memory, and
   (iii) a dual port memory coupled between the first and second memories;

(b) a RAM loader bus coupled to the local memory;

(c) an emulated multiport memory comprising:
   (i) a dual port memory coupled to data lines of the local bus, wherein semaphore and interrupt structure with modular bus arbitration is implemented in said dual port memory to permit inter-program communication between said processing nodes,
   (ii) first global memory coupled to address lines of the local bus,
   (iii) second global memory coupled to address lines of the local bus,
   (iv) an input sensor memory coupled to the address lines of the local bus,
   (v) a first FIFO buffer coupled to the first and second global memories and to the address lines of the local bus,
   (vi) a register coupled between the first FIFO buffer and dual port memory and the global bus,
   (vii) a second FIFO buffer coupled to the input sensor memory, to the address lines of the local bus, and to the local bus,
   (viii) a second register coupled between the data lines of the local bus and the global memories, and
   (ix) a third register coupled between the data lines of the local bus and the input sensor memory;

(d) a logic device;

(e) a local bus coupled between the logic device and the emulated multiport memory;

(f) a sensor bus for transferring sensor signals derived from an external sensor to the plurality of processing nodes;

(g) a global bus for coupling signals between the plurality of processing nodes, said global bus comprised of a time delay multiplexed bus;

(h) a bus controller coupled between the emulated multiport memory and the sensor and global busses for controlling movement of signals to and from the emulated multiport memory carried by the sensor and global busses; and (i) a memory address generator coupled to the logic device for reading and writing data from and to the local memory and the emulated multiport memory.

* * * * *